United States Patent
Gambardella et al.

(10) Patent No.: US 7,376,088 B2
(45) Date of Patent: May 20, 2008

(54) REDUNDANT COMMUNICATION NETWORK OF THE SWITCHED FULL-DUPLEX ETHERNET TYPE AND A MANAGEMENT METHOD OF THE REDUNDANCY OF SUCH A NETWORK, NOTABLY IN THE AVIONIC DOMAIN

(75) Inventors: Eddie Gambardella, Blagnac (FR); Stephane Monnier, Blagnac (FR)

(73) Assignee: Airbus France, Toulouse (FR)

( * ) Notice: Subject to any disclaimer, the term of this patent is extended or adjusted under 35 U.S.C. 154(b) by 612 days.

(21) Appl. No.: 11/009,023

(22) Filed: Dec. 13, 2004

(65) Prior Publication Data

US 2005/0147029 A1 Jul. 7, 2005

(30) Foreign Application Priority Data

Dec. 17, 2003 (FR) .................................. 03 51094

(51) Int. Cl.
*H04L 12/26* (2006.01)
*H04M 3/00* (2006.01)

(52) U.S. Cl. ...................... 370/252; 370/216; 370/230; 379/279

(58) Field of Classification Search ................ 370/216, 370/218, 230, 276–296, 252, 231, 295, 389, 370/392; 375/250, 252; 379/279; 714/758; 345/631
See application file for complete search history.

(56) References Cited

U.S. PATENT DOCUMENTS

| | | | |
|---|---|---|---|
| 5,784,375 A | 7/1998 | Kalkunte et al. | 370/448 |
| 2003/0147377 A1 | 8/2003 | Saint Etienne et al. | |
| 2003/0152077 A1 | 8/2003 | Saint Etienne et al. | |
| 2004/0208116 A1* | 10/2004 | Saint Etienne et al. | 370/216 |

\* cited by examiner

*Primary Examiner*—Afsar Qureshi
(74) *Attorney, Agent, or Firm*—Oblon, Spivak, McClelland, Maier & Neustadt, P.C.

(57) ABSTRACT

A redundancy management method of a switched full-duplex Ethernet communication network includes at least two independent elementary networks each of which includes at least one source equipment and at least one destination equipment. The method includes a step for defining a window included within a predetermined interval corresponding to the frames already received at a given instant, a step for comparing the number of the frame received with the window, and a step for accepting the received frame when the frame number is not included in the window.

12 Claims, 3 Drawing Sheets

REDUNDANT COMMUNICATION NETWORK OF THE SWITCHED FULL-DUPLEX ETHERNET TYPE AND A MANAGEMENT METHOD OF THE REDUNDANCY OF SUCH A NETWORK, NOTABLY IN THE AVIONIC DOMAIN

TECHNICAL FIELD

This invention relates to a redundant communication network of the Switched Full-Duplex Ethernet type and a management method of the redundancy of such a network, notably in the avionic domain.

STATE OF PRIOR ART

The Ethernet network, which is the worldwide reference for communication networks, allows sending data in digital form by packets or "frames"; a frame is defined as a set of data sent once over the network. The data of each frame are not interpreted. The network transports them without knowing their meaning. A frame is composed of two types of data: network data used to rout the frame to the correct port and useful data that are the "useful load" of the frame.

FIG. 1 illustrates an Ethernet network composed of two inter-connected switches 11 and each linked to subscriber equipment 12 in point-to-point mode. The operation of such a network is simple. Each subscriber of the network can transmit frames at any time in digital form to one or several other subscribers. When the frames are received by a switch 11, the "network information" data are analysed to discover the destination equipment(s). The frames are then switched to this (or these) equipment(s).

Switched "Full-Duplex" Ethernet type communication networks such as those defined in the document referenced [1] at the end of the description, which is based on the Switched Full-Duplex Ethernet standard described by the IEEE802.3 standard, offers improved functionality with respect to this standard to allow a better reliability in the transmission of information, notably, in the avionic domain. The network, indeed, offers a deterministic transmission time obtained by the addition of communication services on the Ethernet network. This deterministic aspect uses a virtual link concept, which is a conceptual representation of a source equipment link to at least one destination equipment.

As illustrated in FIG. 2, such a virtual link (VL) concept allows isolating the data transfers between a source equipment 13 and destination equipments 14. A virtual link is viewed as a "channel" over the network. A virtual link is characterised in that it has:
- a transfer direction; the virtual link is unidirectional,
- a unique source equipment 13,
- one or several destination equipment,
- a fixed passband (maximum number of packets and their size per second),
- a maximum guaranteed transfer time of the packets of a source equipment 13 to a destination equipment 14, regardless of the behaviour of the rest of the network; each virtual link has its own transfer time,
- a fixed path over the network,
- a unique identifier, The switch 11 knows, through the use of a static configuration table, the virtual links that it must switch, as well as the number of packets authorised by a virtual link.

The concept of virtual links allows fixing the communications between equipments by configuring the routes and passbands allocated to the virtual links. Thus, the flow formed by a virtual link is guaranteed not to be disturbed by other flows that share the same physical links across its path in the network. Furthermore, this concept of virtual links allows, through the centralised management of flows, ensuring that the sum of the passbands allocated to the virtual links for a same physical link does not exceed the capacities of its technology.

The links on board an aircraft using such a switched full-duplex Ethernet network can be performed in a redundant manner according to the method described in document referenced [2] at the end of the description. In this case, two equipments pieces, a source equipment and a destination equipment communicate through at least two independent elementary networks RE1 and RE2. In a known manner, the redundancy is performed on a frame by frame basis on each of said networks. On a virtual link, the source equipment successively sends information frames to the destination equipment. Each of said frames is sent, with an identical content, over each of the networks RE1 and RE2. Depending on the load and configuration of said networks, these two identical frames can arrive at the destination equipment at different times. Here we are faced with the case where the two networks operate correctly and thus the two frames arrive at the destination equipment.

As represented in FIG. 3, a frame 1, transmitted at an instant t0, arrives at the destination equipment at a first instant t1 through the first network RE1 and at a second instant t2 through the second network RE2. Frame 1 received at instant t2 through this second network can arrive when frames 2, 3, and 4, which were sent after instant t0; are arrived at the destination equipment through said first network. The destination equipment only has to process once the information transmitted twice over each of the networks RE1 and RE2 by the source equipment. A solution indicated in document referenced [2] consists in only taking into account the first of the two identical frames received by the destination equipment. For this purpose, each frame transmitted by a source equipment includes a frame number that allows identifying it in time.

The purpose of this invention is to improve such a solution by allowing obtaining a better possible availability of the communication between a source equipment and a destination equipment to avoid, in particular, any prolonged blocking of said communication.

PRESENTATION OF THE INVENTION

The invention relates to a method for managing the redundancy of a switched full-duplex Ethernet type communication network that includes at leas two independent elementary networks that include each at least one source equipment and at least one destination equipment interlinked by at least one physical link through at least one switch; each equipment is linked to each elementary network, in which each frame transmitted by a source equipment over a virtual link of an independent elementary network includes a number within a predetermined interval, characterised in that during reception by a destination equipment, of a frame over a virtual link at a given instant, said method includes the following steps:
- a step for defining, for this virtual link, a window included within said predetermined interval corresponding to the frames already received at this given instant,
- a step for comparing the number of the frame received with said window,
- a step for accepting the received frame when the frame number is not included in said window.

In the first embodiment, additionally, the following steps are included:

a step for initialising a timer at a specific value each time that a frame received over the virtual link in question is accepted by the destination equipment, a step for decreasing the current value of this timer over time, a step for accepting by the destination equipment of the frame received over the virtual link in question if this current value is reset to zero.

In a second embodiment, during the definition step of a window, the frame number overflow is taken into account.

In a third embodiment, there are the prior comparison steps of the number of a frame that arrives to a destination equipment with the number of the previous frame, and rejection of said frame if the number of this frame is not consecutive to the number of the previous frame.

Advantageously, the destination equipment accepts the frames whose number corresponds to the frame number normally transmitted by the source equipment after a reset.

In all cases, a received frame can be rejected if this frame has the same number as the previously received frame.

Such a method can advantageously be used in the avionic domain.

The invention also relates to a redundant communication network of the switched full-duplex Ethernet type that includes at least two independent elementary networks each of which includes at least one source equipment and at least one destination equipment interlinked by at least one physical link through at least one switch; each equipment is linked to each elementary network, in which each frame transmitted by a source equipment over a virtual link of an independent elementary network includes a number included in a predetermined interval, characterised in that it includes a redundancy managing module, which includes:

means for defining, for each frame received over a virtual link at a given instant, a window included within said predetermined interval, corresponding to frames already received at that given instant, means for comparing the number of the received frame with said window, means for accepting the received frame when the frame number is not included in said window.

This network can include a timer linked to this redundancy management module that can be reinitialised by this module and that can notify it of its reset. It can also include control modules of the sequencing of the frames arriving through the independent elementary networks.

DETAILED PRESENTATION OF SPECIFIC EMBODIMENTS

In the method described in document referenced [2], each frame transmitted by a source equipment over a virtual link of one of several independent communication elementary networks. RE1, RE2, etc. includes frame number information that allows identifying in time. This frame number is included within a predetermined interval, for example values from 0 to 255, which correspond to a coding of said frame number over one byte. A source equipment sends, over each of the elementary networks RE1, RE2, etc., successive distinct frames with consecutive frame numbers.

Figure 1:
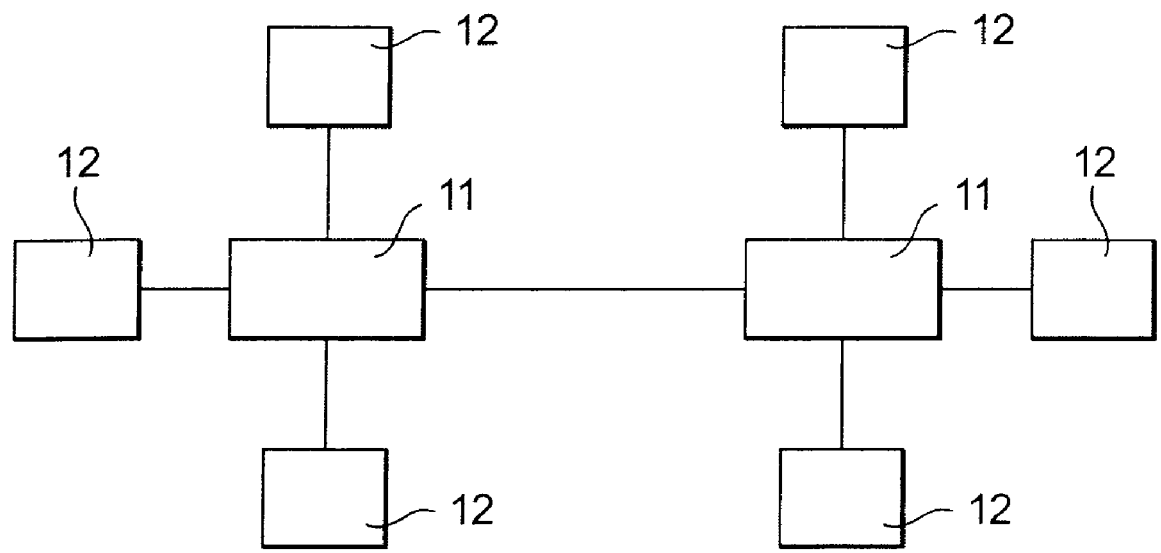
FIG. 1 illustrates an Ethernet network of prior art.
Figure 2:
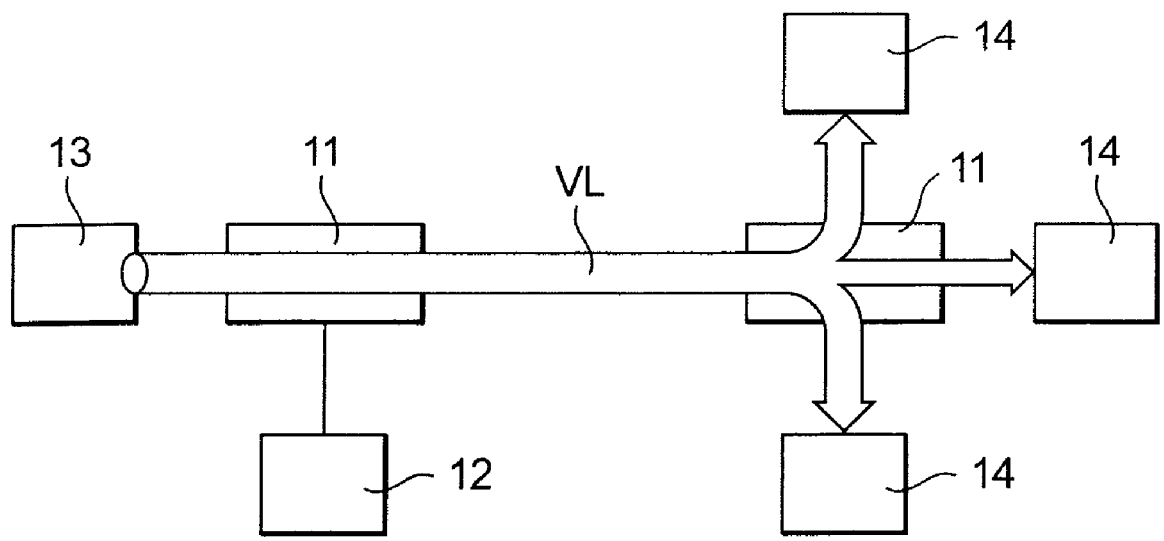
FIG. 2 illustrates the concept of virtual links in an Ethernet network of the prior art.
Figure 3:
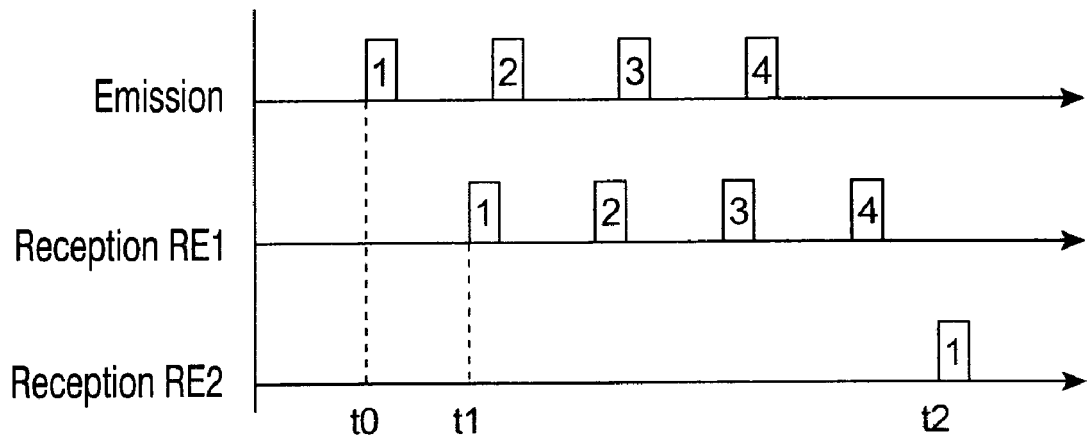
FIG. 3 illustrates the operation of an Ethernet network of the prior art.
Figure 4:
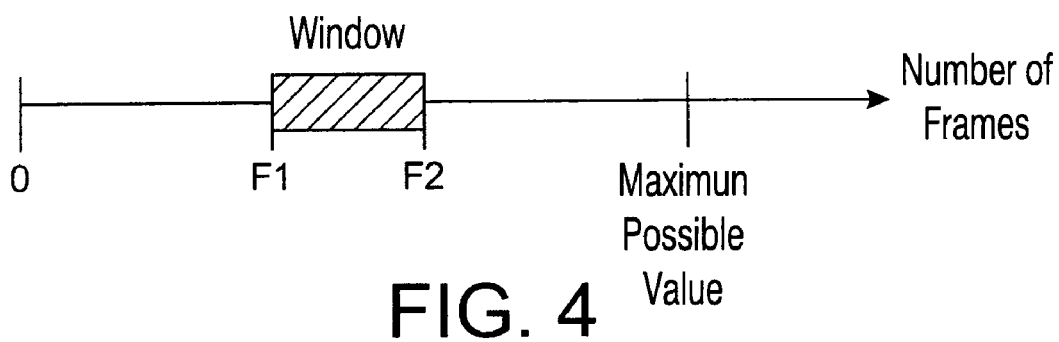
FIG. 4 illustrates the method of the invention.

In the invention method, when a destination equipment receives a frame from a source equipment over a virtual link at a given instant, the following steps are performed:

a step for defining, for this virtual link, a window of numbers included within said predetermined interval, which corresponds to frames already received at this given instant, as illustrated in FIG. 4; this window is chosen by taking into account the numbers of the previously received frames as well as the maximum reception time difference between two frames simultaneously transmitted over two distinct elementary networks (network "skew") in order to ensure that all the numbers of this predetermined interval located outside said window corresponds to future frames.

a step for comparing the number of the frame received with said window, a step for taking into account by the destination equipment of said frame only if this frame number is not included in the window because this frame has not previously been received.

In contrast, if the number is included in said window, the frame is not taken into account by the destination equipment.

Thus, thanks to the invention method, when due to the network redundancy a destination equipment receives several frames that include a same frame number, only the frame, from among these frames received first is accepted by the destination equipment.

In a first advantageous embodiment of the invention method, the following steps are included:

a step for initialising a timer at a predetermined value each time that a frame received on the virtual link in question is accepted by the destination equipment, a step for decreasing the current value of said timer over time, a step for accepting, by the destination equipment, the next frame received over the virtual link in question during the second step of the method if this current value is reset to zero, even if the corresponding frame number is included within said window.

Such a feature allows preventing extended blocking of the receipt of frames from the source equipment, subsequently to the reset of said equipment, which can cause discontinuity in the numbering of frames transmitted over the virtual link in question. Thus the time during which the received frames are rejected by the destination equipment over this virtual link after a reset of the source equipment is, at the most, equal to the duration corresponding to the counting down of the timer of said predetermined value to zero. It results in good availability of the link between the source equipment and the destination equipment over this virtual link.

Figure 5:
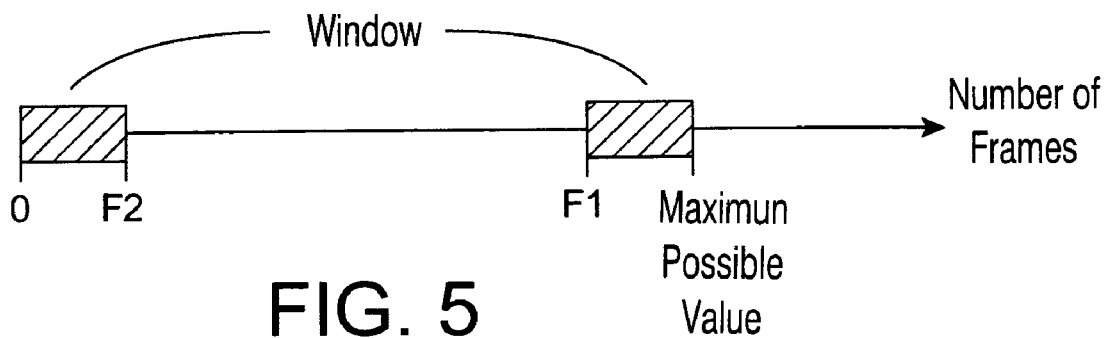
FIG. 5 illustrates an advantageous embodiment of the invention.

In a second advantageous embodiment illustrated in FIG. 5, during the step for defining a window, the overflow of the frame number is taken into account; when it reaches its maximum value taken into account from its encoding (for example 255 if it is encoded over one byte) it is reset to zero. Thus, on this Figure, the window F1-F2 extends from either side of the predetermined interval of frame numbers.

In a third advantageous embodiment of the invention, during a prior step of the invention method, a control of the sequencing of the frame received over each of the elementary networks RE1, RE2, etc is performed. When a frame arrives at the destination equipment through one of said elementary networks, the number of this frame is compared to the number of the previous frame arrived through this same elementary network. If the number of this frame is not consecutive to the number of the previous frame, the destination equipment rejects the frame. Otherwise, this frame is accepted as regards to the control in sequencing and the method proceeds to the steps for defining, comparing, and taking into account previously considered frame.

This embodiment allows rejecting the frames transmitted randomly over the network, for example due to disturbances in said network, or frames that are repeated in an identical manner, for example, in the case the source equipment is blocked. Therefore, this allows improving the operating security.

Advantageously, when controlling sequencing, the destination equipment accepts the frames whose number corresponds to the number of the frame normally transmitted by the source equipment after the latter is reset, for example to zero, even if this number is not consecutive to the number of the previous frame received. This allows avoiding the rejection of the first frame transmitted by the source equipment after a reset, which contributes to the correct availability of the link. Nevertheless, even in this case, the destination equipment rejects the received frame if the number of this frame is identical to the number of the previously received frame; this situation can, for example, correspond to the blocking of the source equipment.

Figure 6:
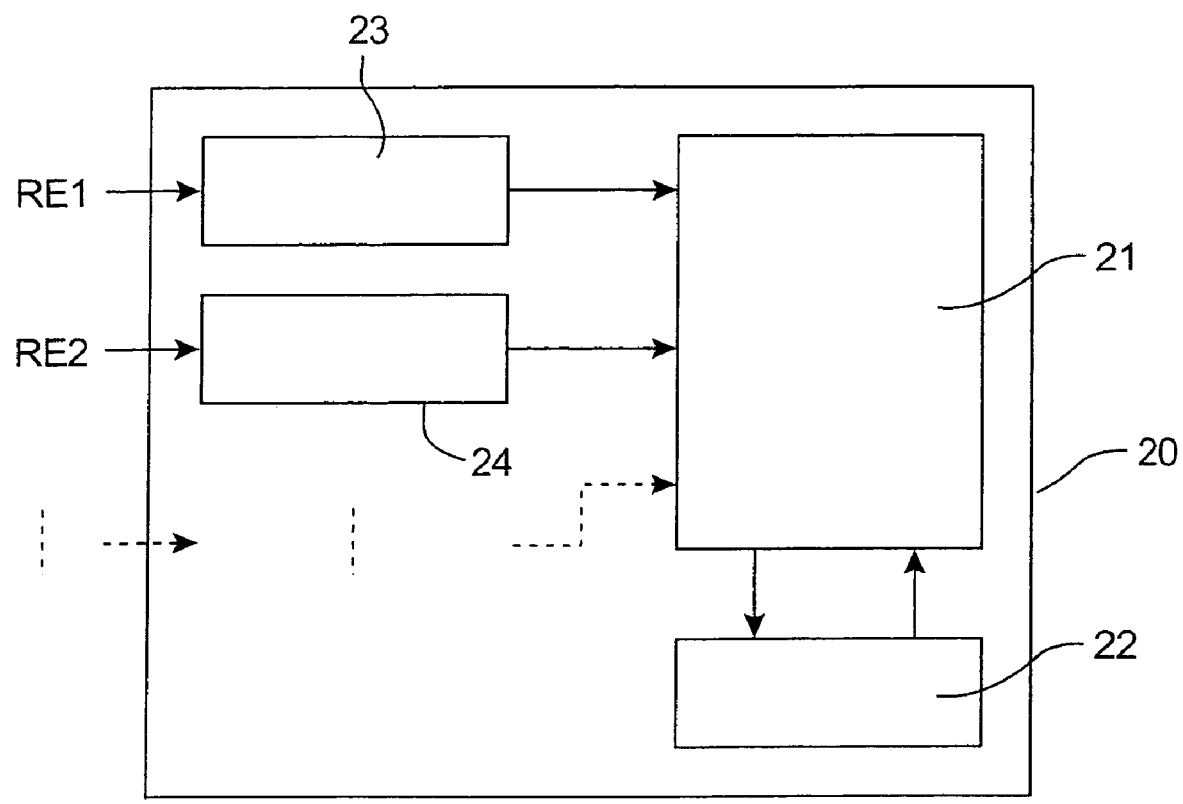
FIG. 6 illustrates the redundant communication network of the invention.

The invention also relates to a redundant communication network of the switched full-duplex Ethernet type that allows implementing the previously described method. As represented in FIG. 6, this network 20 includes a redundancy management module 21.

In a preferred embodiment, this network 20 also includes a timer 22 that can be initialised by the redundancy management module 21 and that can inform the latter of its reset.

In another preferred embodiment, this network 20 also includes modules 23, 24, etc. for controlling the sequencing of the frames arriving through the elementary networks RE1, RE2, etc.

EXAMPLE OF AN EMBODIMENT OF THE NETWORK OF THE INVENTION

In an example of an embodiment two elementary network RE1 and RE2 on which a source equipment communicates with a destination equipment over a virtual link are considered. Depending on the characteristics of said elementary networks, it can be determined a SKEWmax time that corresponds to the maximum deviation, as an absolute value, between time t1 and time t2 necessary to route a frame from the source equipment to the destination equipment, respectively, over these elementary networks RE1 and RE2.

A BAG interval is defined as the smallest time interval possible between two consecutive frames when they are transmitted by the source equipment. In practice, the interval between two consecutive frames during their transmission will be equal to N x BAG, where N is a positive integer at least equal to 1.

That is RWS ("Reject Window Size") is the width of the window defined during the definition step of the invention method. In this embodiment example, the following is chosen:

$$RWS = E(SKEWmax/BAG) + 2, \text{ with } E(\ldots) = \text{whole part}$$

In a specific embodiment of the invention, a subtraction operator "−SN" that allows managing the overflow of the frame number is defined. In the case where the frame number is encoded over one byte (possible values: 0 to 255,) this subtraction operator can be defined as follows:

$$S_1 -_{SN} S_2 =_{def} ((S_1 - S_2 + SN\_HALF) \bmod SN\_CNT) - SN\_HALF$$

Then the comparison operators based on this operator −SN are defined:

$$S_1 <_{SN} S_2 \Leftrightarrow_{def} (S_1 -_{SN} S_2) < 0$$

$$S_1 =_{SN} S_2 \Leftrightarrow_{def} (S_1 -_{SN} S_2) = 0$$

$$S_1 >_{SN} S_2 \Leftrightarrow_{def} (S_1 -_{SN} S_2) > 0$$

Where SN_HALF=128 and SN_CNT=256

Therefore, this operator is used to accept or reject a frame arriving at the destination equipment, for example according to the following algorithm:

```
if ((RSN >SN PSN) or (RSN <SN PSN − RWS) or
timer_expired( )) {
        FLAG := true              //Frame accepted
        PSN := RSN
        Start_timer(SkewMax)
    }else{
        FLAG := false             //Frame discarded
    }
    return FLAG
}
where
RSN = (last) received frame number
PSN = previous received frame number
```

This algorithm advantageously takes into account the previously mentioned timer 22.

REFERENCES

[1] U.S. 2003/0152077
[2] U.S. 2003/0147377

The invention claimed is:

1. A redundancy management method of a switched full-duplex Ethernet communication network that includes at least two independent elementary networks each of which includes at least one source equipment and at least one destination equipment inter-linked by at least one physical link through at least one switch; each equipment piece being linked to each elementary network, in which each frame transmitted by a source equipment over a virtual link of an independent elementary network includes a number within a predetermined interval, wherein during reception by a destination equipment of a frame over a virtual link at a given instant, said method includes:

a step of defining, for said virtual link, a window included within said predetermined interval corresponding to the frames already received at said given instant,
   a step of comparing the number of the frame received with said window, and
   a step of accepting the received frame when the frame number is not included in said window.

2. The method according to claim 1, wherein the window of frame numbers, included in the predetermined interval is chosen by taking into account the numbers of the previously received frames, as well as the maximum time reception difference between two frames transmitted simultaneously over two distinct elementary networks in order to ensure that all the frame numbers of said interval found outside said window correspond to future frames.

3. The method according to claim 1, wherein additionally, the following steps are included:
- a step of initialising a timer at a specific value each time that a frame received over the virtual link in question is accepted by the destination equipment,
- a step of decreasing the current value of said timer over time,
- a step of accepting by the destination equipment of the following frame received over the virtual link in question if said current value is reset to zero.

4. The method according to claim 3, wherein during the step of defining said window, the overflow of the frame number is taken into account.

5. The method according to claim 1, comprising previous steps of comparing the number of a frame that arrives at a destination equipment with the number of the previous frame, and of rejecting said frame if the number of said frame is not consecutive to the number of the previous frame.

6. The method according to claim 5, wherein the destination equipment accepts the frames whose number corresponds to the number of the frame normally sent by the source equipment after a reset.

7. The method according to claim 5, wherein a received frame is rejected if this frame has the same number as the previously received frame.

8. The method according to claim 1, wherein said communication network is an avionic network.

9. A switched full-duplex Ethernet type redundant communication network that includes at least two independent elementary networks each of which includes at least one source equipment and at least one destination equipment interlinked by at least one physical link through at least one switch; each equipment piece being linked to each elementary network, wherein each frame transmitted by a source equipment over a virtual link of an independent elementary network includes a number within a predetermined interval, which includes a redundancy management module that includes:
- means for defining, for each frame received over a virtual link at a given instant, a window included within said predetermined interval, corresponding to the frames already received at that given instant,
- means for comparing the number of the received frame with said window, and
- means for accepting the received frame when the frame number is not included in said window.

10. The network according to claim 9, wherein the window of frame numbers, included in the predetermined interval, is chosen by taking into account the numbers of the previously received frames, as well as the maximum time reception difference between two frames simultaneously transmitted over two distinct elementary networks in order to ensure that all the frame numbers of said interval located outside said window correspond to future frames.

11. The network according to claim 9, further comprising a timer linked to said redundancy management module.

12. The network according to claim 9, comprising modules for controlling a sequencing of the frames that arrive through the independent elementary networks.

* * * * *